United States Patent [19]

Lange et al.

[11] Patent Number: 5,057,127
[45] Date of Patent: Oct. 15, 1991

[54] FILTER ELEMENT FOR USE IN BAGGING ASBESTOS DURING AN ASBESTOS REMOVAL PROCESS

[76] Inventors: Terry J. Lange, 17123 Coronado #2, Eagle River, Ak. 99577; Greg Johnston, 11314 Noonday, San Antonio, Tex. 78233

[21] Appl. No.: 517,078

[22] Filed: May 3, 1990

[51] Int. Cl.$^5$ ............................................. B65B 31/00
[52] U.S. Cl. .......................................... 55/97; 55/467; 141/7; 141/65
[58] Field of Search ................ 55/97, 385.2, 418, 429, 55/467; 141/7, 65

[56] References Cited

U.S. PATENT DOCUMENTS

| | | | |
|---|---|---|---|
| 2,695,741 | 11/1954 | Haley | 141/65 |
| 3,238,556 | 3/1966 | Martin | 15/330 |
| 3,963,623 | 6/1976 | Buss | 210/401 |
| 4,084,390 | 4/1978 | Schmachtel et al. | 141/65 |
| 4,085,231 | 4/1978 | Weston | 141/65 |
| 4,312,388 | 1/1982 | Hager et al. | 55/97 |
| 4,442,001 | 4/1984 | Davis | 210/402 |
| 4,703,782 | 11/1987 | Henkel | 141/65 |
| 4,718,925 | 1/1988 | DeMarco | 55/429 |
| 4,749,386 | 6/1988 | Strohmeyer | 55/131 |

Primary Examiner—Jay H. Woo
Assistant Examiner—C. Scott Bushey
Attorney, Agent, or Firm—Terry M. Gernstein

[57] ABSTRACT

A filter element is placed over the inlet of a hose used to draw a vacuum on a bag that contains asbestos-containing materials collected during an asbestos removal process. The filter element is disposable and is removed from the hose as that hose is pulled out of the bag after the vacuum is drawn on the bag. The filter element is frusto-conical and one embodiment includes a rim located near one end thereof to assist in the removal of the filter element from the hose.

6 Claims, 2 Drawing Sheets

FILTER ELEMENT FOR USE IN BAGGING ASBESTOS DURING AN ASBESTOS REMOVAL PROCESS

TECHNICAL FIELD OF THE INVENTION

The present invention relates to the general art of environmental control, and to the particular field of asbestos removal.

BACKGROUND OF THE INVENTION

Until several years ago, asbestos was commonly used in insulation of commercial and residential structures. This fireproof material allowed pipes and ducts to be insulated to retain heat or cold, yet had little bulk. Floors, walls and ceilings were also insulated to limit heat loss between floors or through walls. Asbestos fibers were also incorporated into ceiling tiles and other building materials for the fire-retardant characteristics thereof as well as for the insulating properties thereof.

However, various studies conducted and published in recent decades have revealed the dangers of breathing even small amounts of asbestos fibers. As insulation coverings break down, tiny fibers are released into the air and into the environment. The microscopic nature of these fibers allows them to be inhaled and, once inhaled may migrate into tiny air sacs of the lungs. Even small numbers of these fibers trapped in the air sacs of the lungs can generate a violent irritation spawning the production of abnormal body cells.

To protect the population from exposure to asbestos, asbestos insulating materials containing asbestos fibers are removed from dwellings and commercial structures. The dangers associated with asbestos fibers are so great, workers on such jobs must wear protective clothing and filter masks or respirators to avoid breathing the fibers loosened during removal.

Accordingly, the art has included several systems for removing asbestos-fiber containing material from work areas. These systems generally include a vacuum system which is connected to a collection bag into which fiber-containing materials are placed. Materials are sucked into the collection bag for removal and disposal. Once the materials are placed in the collection bag, the bag is closed and sealed and moved to a proper disposal area. The dangers are so great that this removal work is often carried out in a clean room-type environment so that any fibers that might be released are moved out of the environs as quickly and reliably as possible.

Unfortunately, for various reasons, during the collection of the fiber-containing materials, such materials have a tendency to agglomerate into "chunks", especially while the materials are being stored in the collection bag during the collection process.

For proper asbestos removal, it is necessary to remove the air from the collection bags containing such collected and bagged asbestos. This helps reduce the incidence of bag puncture and the concomitant release of harmful asbestos particles into the environment during the bagging step. It also contributes to more efficient handling and storing of such bags. Heretofore, these "chunks" have found their way back into the asbestos removal system, or its parts, such as the hose thereof, especially during the step of removing air from the filled collection bags.

Removing the materials, either dry or wet, from the hose and other system elements can be an onerous, time-consuming task which vitiates the overall efficiency of an asbestos-removal project.

Therefore, there is a need for a means and a method for improving the overall efficiency of an asbestos-removal project which increases the efficiency of the bagging step by preventing agglomerated particles from moving out of a collection bag into the vacuum system or the parts thereof.

OBJECTS OF THE INVENTION

It is a main object of the present invention is to provide a means and a method for improving the overall efficiency of an asbestos-removal project.

It is another object of the present invention to provide a means and a method for improving the overall efficiency of an asbestos-removal project by increasing the efficiency of the bagging step.

It is another object of the present invention to provide a means and a method for improving the overall efficiency of an asbestos-removal project which increases the efficiency of the bagging step by preventing agglomerated particles from moving out of a collection bag into the vacuum system or the parts thereof.

SUMMARY OF THE INVENTION

These, and other, objects are achieved by a providing a means and a method for closing a bag used to collect asbestos during an asbestos removal project so that the bag is closed in a manner that both prevents damage to the bag and prevents particles from moving from the bag back into the hose or other parts of the vacuum system. This increases the overall efficiency of the asbestos removal project by eliminating the time wasted cleaning "chunks" of agglomerated asbestos from a hose or other element used to remove air from the collection bag prior to closing that bag.

The means includes a filter element that is slidably placed on the inlet end of a base associated with the vacuum equipment, such as a H.E.P.A. filter system, before that hose inlet is placed inside of a collection bag that is to be closed. The bag is closed either on top of the filter element so that the filter element is interposed between the bag and the hose, or against the hose at a position above the filter element so that the filter element is located inside the bag. The filter element is disposable, and is slid off of the hose as the bag is removed from the hose after a vacuum is placed in the bag.

BRIEF DESCRIPTION OF THE DRAWING FIGURES

DETAILED DESCRIPTION OF THE PREFERRED EMBODIMENT OF THE INVENTION

Figure 1:
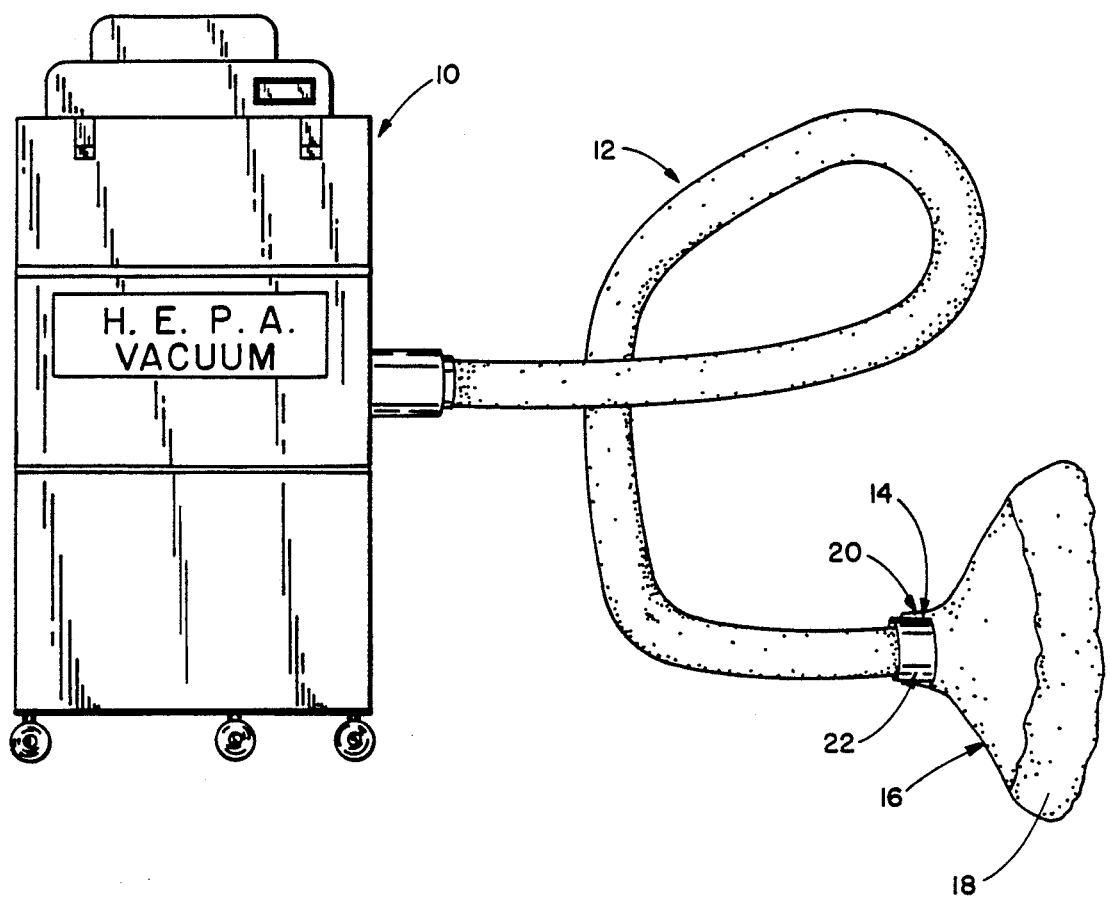
FIG. 1 is an elevational view illustrating a vacuum system used in an asbestos-removal project with a collection bag and a filter element of the present invention.

Shown in FIG. 1 is a portion of an overall system for removing asbestos from a particular area, hereinafter referred to as the work area. The system includes a high efficiency particle air (H.E.P.A.) filter unit 10 having a hose 12 connected thereto. The hose 12 has an inlet end 14. The H.E.P.A. filter unit and the inlet hose function in the manner well known to those skilled in the art, and thus will not be further discussed.

As mentioned above, the overall collection process includes depositing the asbestos fiber-containing materials in a bag, drawing a vacuum on the filled bag, closing the bag and moving the closed bag to a proper location for disposal. The inventors have found that the most effective way of drawing a vacuum on the filled bag is to use the hose 12 and the vacuum system which includes the H.E.P.A. filter unit 10. The hose 12 is placed inside the bag, and the filter unit is activated to draw air out of the bag, and the bag is closed about the material while the vacuum established therein is still intact.

Accordingly, the system embodying the present invention includes a collection bag 16 containing asbestos materials 18. The collection bag 16 includes a mouth 20, and is closed in a manner that is intended to prevent puncture of that bag during shipment thereof. As was also mentioned above, if the hose 12 is used to draw a vacuum on the collection bag, some agglomerated particles located in the bag may move into the hose and into the vacuum unit, and thus may create a problem. The present invention includes a filter element 22 that is placed in covering relation over the inlet end of the hose 12 and thus prevents material from the bag from entering that hose as the hose is used to draw a vacuum on the bag to draw that bag down against the product stored therein. After the desired vacuum is placed on the bag, the hose 12 is simply withdrawn from the bag via the bag mouth 20, with the filter element 22 being slipped off of the hose during this hose removal step to remain inside the bag. The bag is then quickly closed before the vacuum is degraded, and disposed of in the normal manner, with the filter element remaining inside the bag and being disposed of along with the contents of the bag and the bag.

Figure 2:
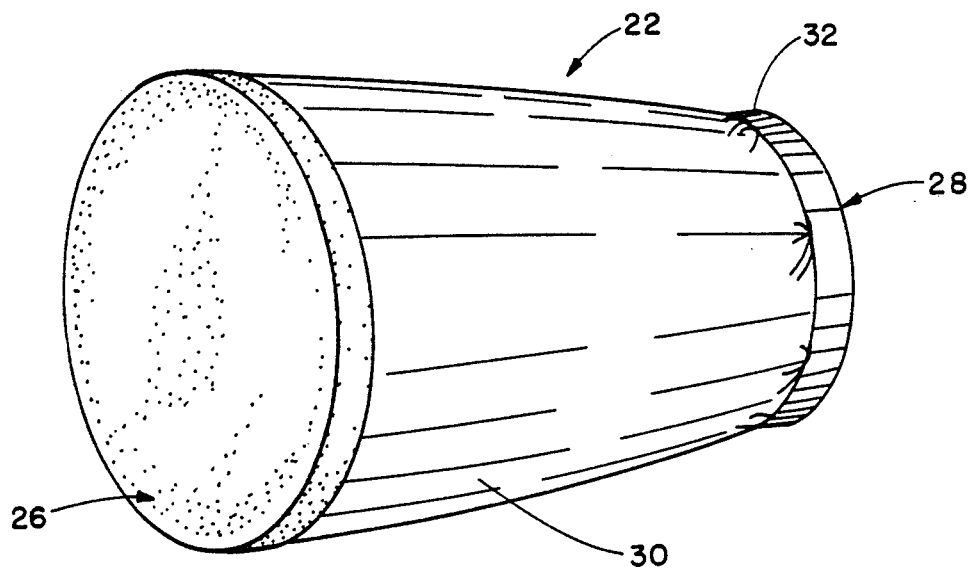
FIG. 2 is a perspective view of a filter element embodying the present invention.

The filter element 22 is best shown in FIG. 2 as being frusto-conical in shape with a base end 26 and a frustum end 28 connected together by a conical outer wall 30.

The outer wall is formed of flexible material, and the base end is formed of stiff porous material. Both the outer wall and the base are foraminous and have pore sizes that range from about one-half millimeter to one millimeter in size. One preferred form of the base material is foam rubber, such as used in devices used to scrub one's face. Since the filter element is intended to be disposable, the materials thereof are selected for a single use.

An elastic stretchable band 32 surrounds the frustum end 28 and is sized to snugly fit around the hose 33 or an inlet nozzle on the inlet end thereof. The band is expandable to a size large enough to permit the hose 12 to be easily moved into the filter element, and the snugness of the fit is selected so the filter element remains firmly in place over the hose inlet end during the vacuum drawing process, yet is easily moved off of the hose when and as the bag 16 is slidably moved off of the end of the hose to be removed from the hose.

The use of the filter element is evident from the foregoing description, and will thus only be briefly described. Once the bag 16 is filled, the filter element 22 is placed over the inlet end of the hose and the hose 12 is inserted through the mouth 20 of the bag. Depending on the relative location of the bag mouth and the filter element, the bag is either pressed directly against the hose with the filter element being totally contained in the bag, or against the filter element surrounding the hose or the filter element adjacent to the mouth of the bag so the filter element is interposed between the bag and the hose at this location. The filter unit 10 is then operated to withdraw air from the bag through the filter element 22 which prevents particles from the bag from re-entering the hose 12. Once the desired vacuum is drawn on the bag, the hose is withdrawn from the bag mouth while the bag is kept pressed against the hose or the filter element to prevent degradation of the vacuum established in the bag. This forces the filter element to slide off of the hose and fall into the bag as the hose is finally withdrawn from the bag mouth. The bag is quickly closed, twisted and tied shut for disposal. A new filter element will be placed on the hose inlet end the next time a bag is to be disposed of.

Figure 3:
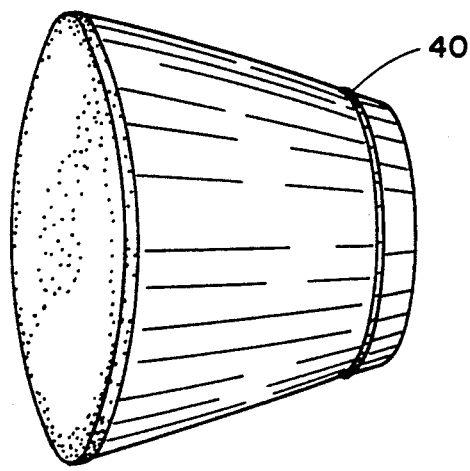
FIG. 3 is a side perspective view of an alternative embodiment of the filter element of the present invention showing a rim element for assisting the removal of the filter element from a hose.
Figure 4:
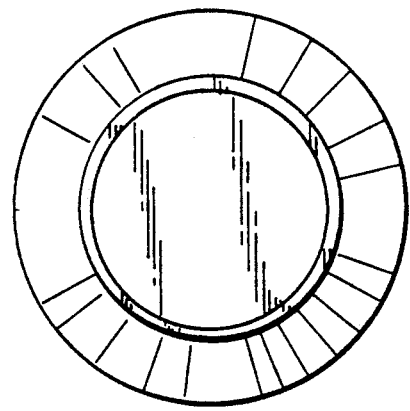
FIG. 4 is a top plan view of the FIG. 3 filter element.

Shown in FIGS. 3 and 4 is a filter element 22' which includes a rim 40 fixedly mounted on the outer wall 30 adjacent to the frustum end 28. The rim 40 projects out of the plane of the outer wall and will abut the bag 18 as that bag is being slipped off of the hose. This abutting contact will facilitate the removal of the filter element from the hose.

In the preferred form of the filter element, the base element is approximately 5/16" to ⅜" thick and about three to three and one-half inches in diameter, with the frustum end being about 1¾" to 2" in diameter with the overall length of the filter element as measured between the base end and the frustum end being about four inches. The base element can be formed of a foam rubber material that is about ten percent rubber and ninety percent air that has been prepared by whipping natural latex into a froth and then gelling and vulcanizing it in a mold. Synthetic rubber and plastics can also be used as well as a Styrofoam material. Polystyrene can also be used by whipping it to a froth and molding it. Natural rubber can also be used with suitable amounts of softening agents added.

The outer wall can be formed of a porous fiber made of a rayon fiber material. Such a material is derived from cellulose and leached from wood chips by the addition of caustic soda. A thick viscous fluid is formed and is forced through minute holes in a platinum disc. The resulting fibers are bathed in a warm acid solution to harden the fibers. After washing and bleaching, the fibers are dried and fluffed and cut into short uniform lengths. The result is batting which has less weight and a greater absorbency than cotton. This batting is then rolled and steamed to form a soft non-woven sheet for the outer wall of the filter element.

It is understood that while certain forms of the present invention have been illustrated and described herein, it is not to be limited to the specific forms or arrangements of parts described and shown.

We claim:

1. A filter apparatus for removing asbestos particles from a work area comprising:
   A) a H.E.P.A. vacuum unit which includes a hose having an inlet, said hose inlet having an outer diameter;
   B) a bag containing air and asbestos particles which have been collected for disposal, said bag having a mouth, said H.E.P.A. vacuum unit hose extending through said bag mouth into said bag with said inlet being located inside said bag; and
   C) a filter element on said H.E.P.A. vacuum hose inlet, said filter element including (1) a frusto-conical body having a base end and a frustum end, said base end having a base diameter and said frustum end having a frustum diameter, an inner surface and an outer surface, said frustum diameter being essentially equal to but slightly larger than said hose inlet outer diameter, said base diameter being larger than said frustum diameter, said base being located to cover said hose inlet, (2) a conical outer wall of porous flexible material, (3) a stiff foraminous filter on said base end in covering relation to said hose inlet, (4) an elastic stretchable band surrounding said frustum end outer surface, (5) said filter element body being hollow and containing said hose inlet end, (6) said filter element frustum end inner surface contacting said vacuum unit hose outer surface at a location which is spaced from said hose inlet, said elastic band surrounding said filter element frustum end outer surface and forcing said frustum end inner surface against said hose outer surface and releasably and slidably attaching said filter element to said hose, and (7) said filter element body completely covering said hose inlet and preventing asbestos particles in said bag from entering said hose when a vacuum is applied to said bag via said hose to remove air from said bag during a bagging process.

2. The filter apparatus defined in claim 1 wherein said filter element base end is formed of foam rubber material, and said outer wall is formed of rayon.

3. The filter apparatus defined in claim 2 further including a ridge on said filter element outer wall adjacent to said frustum end.

4. A method of removing asbestos particles form a work area comprising:
A) transferring air and asbestos particles into a collection bag having an opening;
B) covering a hose inlet with a filter element by
(1) attaching one end of the filter element to the hose at a location spaced from the hose inlet,
(2) covering the hose inlet with a stiff foraminous filter and
(3) extending a portion of the filter element radially outwardly from the hose;
C) inserting the hose inlet with the filter element covering that hose inlet into the collection bag via the bag opening;
D) locating the covered hose inlet between the asbestos in the bag and the bag opening;
E) attaching the bag to the hose so that the filter element is entirely interposed between the asbestos particles in the bag and the hose inlet;
F) drawing air out of the bag through the hose;
G) forcing the bag against the filter element between the filter element one end and the filter element radially extending portion;
H) withdrawing the hose from the bag;
I) sliding the filter element off of the hose while the filter element is still inside the bag;
J) removing the bag and the filter element from the hose; and
K) closing the bag with the filter element inside the bag.

5. The method defined in claim 4 wherein said step of attaching the bag to the hose includes attaching the bag to the hose at a location spaced from the filter element.

6. The method defined in claim 4 wherein said step of attaching

* * * * *